No. 644,968. Patented Mar. 6, 1900.
H. CRAWFORD & J. M. COLLINS.
WHEEL.
(Application filed June 26, 1899.)
(No Model.)
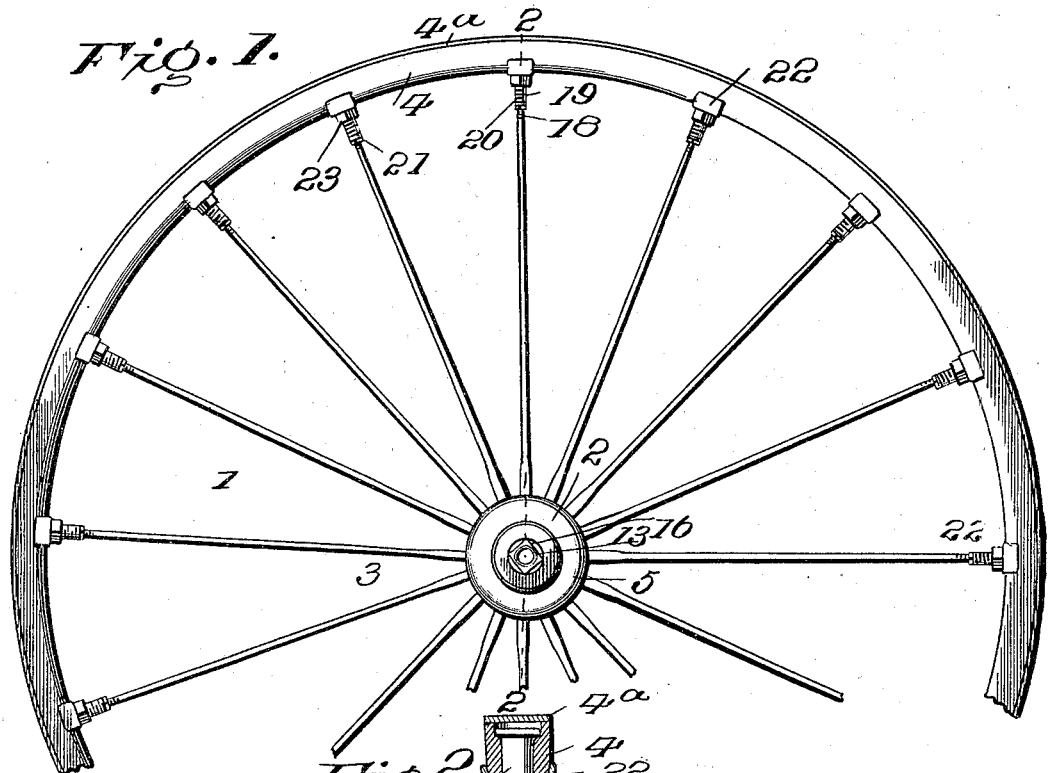
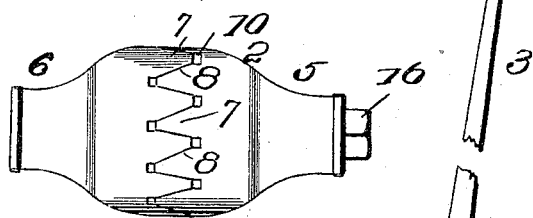
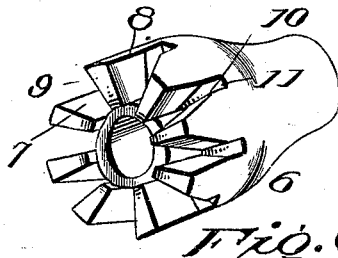
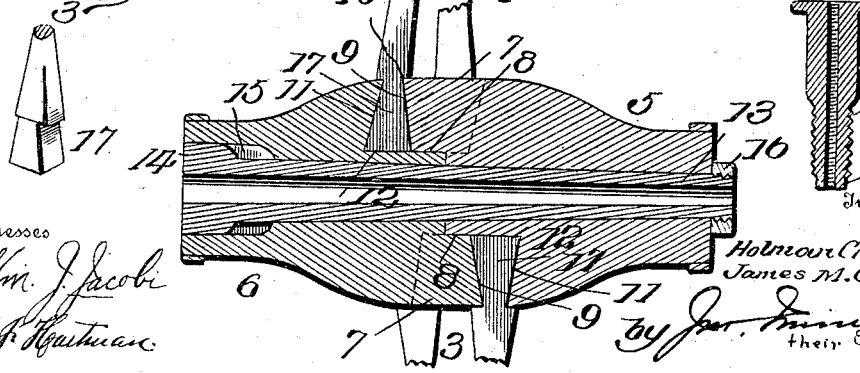
Witnesses
Wm. J. Jacobi
F. J. Hartman
Inventors
Holman Crawford
James M. Collins
by their Attorney
THE NORRIS PETERS CO., PHOTO-LITHO., WASHINGTON, D. C.

UNITED STATES PATENT OFFICE.

HOLMAN CRAWFORD AND JAMES M. COLLINS, OF MAYSVILLE, KENTUCKY.

WHEEL.

SPECIFICATION forming part of Letters Patent No. 644,968, dated March 6, 1900.

Application filed June 26, 1899. Serial No. 721,920. (No model.)

*To all whom it may concern:*

Be it known that we, HOLMAN CRAWFORD and JAMES M. COLLINS, citizens of the United States, residing at Maysville, in the county of Mason and State of Kentucky, have invented new and useful Improvements in Wheels, of which the following is a specification.

This invention relates to an improved wheel, and has for one object to provide a positively-rigid structure between the felly and hub when the parts are locked together.

A further object is to provide a wheel structure whereby a tire can be tightened without the usual heating and cutting of the same.

A further object is to provide a hub structure made in two sections, the meeting faces of which are provided with spoke-interlocking means.

A further object is to provide means on the ends of the spokes whereby the felly of the wheel can be adjusted at any particular location.

Many other objects will be hereinafter referred to, and particularly pointed out in the claims.

In the drawings forming a part of this specification, Figure 1 is a front view of a portion of our improved wheel. Fig. 2 is a vertical section on line 2 2, Fig. 1. Fig. 3 is a detail view of one of the hub-sections. Fig. 4 is a view of the hub. Figs. 5 and 6 are detail views.

The same numerals refer to like part in all the figures of the drawings, wherein—

1 indicates the wheel as a whole; 2, the hub; 3, the spokes; 4, the felly, and 4ª the tire.

The hub is made in two sections 5 and 6, each having a central perforation and a series of interlocking teeth 7. The teeth are preferably tapering in plan view, fitting in similar-shaped spaces 8, formed by the teeth on the adjacent hub-section. The outer end of each tooth is undercut, as at 9. At the base of each of the spaces 8 is formed a seat 10, approximately square in cross-section, the inner wall of which is undercut, as at 11. When the hub-sections are placed together on the box, the undercuts 9 and 11 form a dovetail pocket or seat 12 for the spokes 3.

The hub-sections are mounted on the usual box 13, which has a shoulder 14 and lugs 15, which latter are seated in the section 6. The outer end of the box is threaded and receives a clamping-nut 16 when the hub-sections are locked.

Each of the spokes 3 has an inverted-V-shaped head 17, which is designed to be seated in the pocket 12 in the hub. The spokes preferably taper and at their outer ends are provided with screw-threads 18. A thimble 19 is passed through the felly of the wheel and is received onto the end of the spoke. That portion which passes through said felly is smooth on the outer side, however. Below this point it is slightly reduced and externally threaded, as at 20, and below said threads it is formed with a square boss 21.

A clamp 22 clamps the inner and lower portions of the felly and is retained on the spoke by a jam-nut 23.

The operation and advantages, it is thought, will be apparent from the foregoing, taken in connection with the accompanying drawings.

The hub-section 6 is first placed on the box and the spokes preliminarily placed in the felly-sections and in seats in said section. Then the section 5 is placed on the box, and the nut 16 clamps the two tightly together. The tire is now placed around the felly and the various thimbles adjusted, after which the jam-nuts 23 are set, securely binding the tire to the felly, at the same time producing a wheel which is absolutely rigid in every part and yet each and every part being capable of adjustment independent of the other. The clamp 22 prevents the felly from splitting. Moreover, it prevents the nut from defacing the wood.

In the manufacture of our improved wheel we propose to make all the parts of metal and the felly of wood, making a more durable and practical wheel than at present on the market.

Should the tire become loose and require tightening, it only requires the various thimbles to be adjusted and the lock-nuts reset and the work is accomplished, requiring no skilled workman. We are also enabled to place either a metal or rubber tire on the felly without requiring any structural change.

The wheel is extremely simple in construction and durable in character and one that can be packed and shipped in a comparatively small space.

A further advantage of our improved wheel resides in the fact that by making the felly of wood and the other parts of metal we prevent the structure from rattling, which is the strongest present objection to a wheel having its parts made of metal.

What we claim is—

1. In a wheel, the combination with the hub made in two sections, means at the meeting ends of said sections for locking the spokes thereto, of headed spokes forming part of said locking means, of a thimble on the end of each spoke, passing through the felly, and a clamp and nut for adjusting and holding the parts of the wheel in fixed relation, substantially as set forth.

2. In a wheel the combination with a series of spokes, each provided with a locking-head at its inner end, a thimble screwed on the outer end, which is seated in the felly of a wheel, a jam-nut working on the external screw-threads of the thimble, and a clamp interposed on said thimble and between the felly and the jam-nut, substantially as set forth.

3. In a wheel, the combination with the felly thereof, a series of thimbles seated in perforations in said felly, the thimble having an interior screw-thread, the spokes having threaded ends, and screwed into the thimble, the latter having a flanged head, a reduced exterior threaded portion and a square boss below said threaded portion, a clamp interposed between the felly and a jam-nut, and adapted to hug each side and the bottom of the felly, substantially as set forth.

4. An interiorly-threaded thimble for securing metal spokes to a felly, consisting of a cylindrical body portion, reduced at the lower end and exteriorly screw-threaded, and a square boss formed below said reduced threaded portion for applying a wrench or the like for adjustment, substantially as set forth.

5. In a wheel the combination, with the felly, a spoke made of single pieces having a threaded outer end, and a head at its inner end, approximately an inverted-V shape in side view, of a thimble seated in the felly of the wheel, having an adjusting connection with said thimble and the threaded outer end of the spoke, a boss formed on the lower end of the thimble and below said outer threads, and a hub made in two sections, each section provided with oppositely-disposed projections and slots forming seats to conform to the configuration of the head at the inner end of the spokes, substantially as set forth.

In testimony whereof we have hereunto set our hands in the presence of two subscribing witnesses.

HOLMAN CRAWFORD.
   JAMES M. COLLINS.

Witnesses:
 JOHN GABBY,
 BEN WARDER.